United States Patent [19]

Toperzer

[11] Patent Number: 4,977,345

[45] Date of Patent: Dec. 11, 1990

[54] SPRING MOUNTED CARBON BRUSH WEAR INDICATOR

[75] Inventor: Edward S. Toperzer, Deltona, Fla.

[73] Assignee: Westinghouse Electric Corp., Pittsburgh, Pa.

[21] Appl. No.: 469,975

[22] Filed: Jan. 25, 1990

[51] Int. Cl.[5] ...................... H01R 39/58; H02K 13/00

[52] U.S. Cl. .................................. 310/242; 116/208; 116/278; 310/240

[58] Field of Search ............... 310/42 R, 89, 242, 245, 310/248, 239, 240; 340/648, 679; 116/208, 278; 188/1.11

[56] References Cited

U.S. PATENT DOCUMENTS

| | | | |
|---|---|---|---|
| 2,840,732 | 6/1958 | Nottelmann et al. | 310/239 |
| 3,484,939 | 12/1969 | Perry | 116/278 |
| 3,512,499 | 6/1970 | Runde et al. | 116/278 |
| 4,338,538 | 7/1982 | Major | 310/245 |
| 4,344,008 | 8/1982 | Major | 310/242 |
| 4,344,009 | 8/1982 | Reynolds | 310/242 |
| 4,348,608 | 9/1982 | Michael | 310/242 |
| 4,488,078 | 12/1984 | Orton | 310/242 |
| 4,513,495 | 4/1985 | Kimberlin | 310/242 |
| 4,723,084 | 2/1988 | Reynolds | 310/242 |
| 4,739,208 | 4/1988 | Kimberlin | 310/242 |
| 4,743,787 | 5/1988 | Bunner | 310/242 |

*Primary Examiner*—Steven L. Stephan
*Assistant Examiner*—D. L. Rebsch
*Attorney, Agent, or Firm*—Michael G. Panian

[57] ABSTRACT

Apparatus for visually indicating a worn brush condition for carbon brushes arranged in a gang-type brush holder. A strip of red Teflon tape, or other distinctive marking, is positioned on the linear spring having a coiled top portion which biases the brush into contact with the collector ring. As the brush wears down, the marking on the spring becomes visible as the spring coils more and more. The tape is positioned on the spring such that, when the exposed top portion of the spring shows completely red (i.e., the color of the marking), it is indicated to the operator that a worn brush is to be replaced.

8 Claims, 3 Drawing Sheets

SPRING MOUNTED CARBON BRUSH WEAR INDICATOR

TECHNICAL FIELD

The invention relates to carbon brush current collection systems, and more particularly to an individual carbon brush wear indicator.

BACKGROUND OF THE INVENTION

In certain high speed rotating equipment with static excitation, such as large turbine-generator systems, carbon brush current collection systems are utilized in conducting a field current to the generator rotor. The collector sets typically comprise a pair of collector rings, or one for each pole, mounted on the rotor and a set of stationary brushes angularly displaced around, and in contact with, each collector ring. In order to protect the collector sets and to prevent inadvertent contact with them by personnel, they are usually housed within an enclosure which includes a fixed base. This enclosure is commonly referred to as a collector house. Typically the collector house includes stationary traverse end walls having sealed openings through which the rotor shaft passes and a house defining the roof and sidewalls of the enclosure. In some installations, it is desirable to be able to change the brushes without shutting down the generator. Accordingly, the housing is provided with doors through which access may be gained to the collector set.

Because of high energy demands, it is common to arrange several carbon brushes within a magazine or gang type brush holder. Several brushes, normally six, are grouped within the brush holder, a plurality of which are arranged around the outside diameter of the generator rotor. Examples of such brush holders are described in U.S. Pat. Nos. 3,387,155, issued on June 4, 1968, and U.S. Pat. No. 3,710,478 which issued on Jan. 16, 1973.

While these devices permit ease of brush replacement, it must first be determined when one or more brushes has become worn to the point that it must be replaced. This is typically done by a visual inspection of the brushes on a periodic basis. Such inspections are done while the generator is on-line, in order to minimize the down time of the power generation system. Thus, an inspector, in order to visually inspect for worn brushes, must enter a relatively hostile environment while the generator is operating. Difficulty can arise in visually inspecting those brushes disposed on the interior of the brush holder, due to their location with respect to the outer brushes. What is needed then is a device whereby a worn brush condition can be easily viewed by an operator so as to allow for a quick determination of any worn brush condition.

Application Ser. No. 388,890, filed on Aug. 3, 1989, describes a means for remotely determining when one or more carbon brushes within a ganged brush holder has worn down a predetermined amount. Briefly, a strip of electrically-conductive material is secured to the holder and configured so as to be electrically insulated from the holder when a new brush is inserted into the holder. The strip contacts the brush by means of a finger having an insulated knob such that, when the brush has worn a predetermined amount, the knob disengages the brush so that the finger is caused to contact the brush holder. A light emitting diode, electrically connected to the strip and located at a remote location, is then illuminated to indicate the worn brush condition. The above-referenced application is assigned to the present assignee and is hereby incorporated by reference.

DISCLOSURE OF THE INVENTION

It is therefore an object of the present invention to provide a simple and quick means of determining a worn brush condition.

It is a further object of the present invention to provide a means for quickly determining, through a visual inspection, a worn brush condition for interior brushes within a magazine-type brush holder.

It is a still further object of the present invention to provide a low-cost solution to visual worn brush detection.

The above objects are obtained by the present invention, according to which, briefly stated, a dynamoelectric machine having a rotatable shaft, and a collector ring axially spaced on the shaft and rotatable therewith includes a plurality of stationary carbon collector brushes angularly supported about the collector ring and in sliding contact therewith. The brushes are grouped within a plurality of removable holders such that a portion of the brushes are singularly removable from contact with the collector ring. Each brush is biased against the collector ring by a spring having one end secured to the brush holder and an opposite end coiled against the brush, such that the spring further coils as the brush wears. Means are provided for visibly indicating when any of the brushes within the holders has worn down a predetermined amount.

BRIEF DESCRIPTION OF THE DRAWINGS

Various other objects, features, and advantages of the invention will become more apparent by reading the following detailed description in conjunction with the drawings, which are shown by way of example only, wherein.

Figure 4:
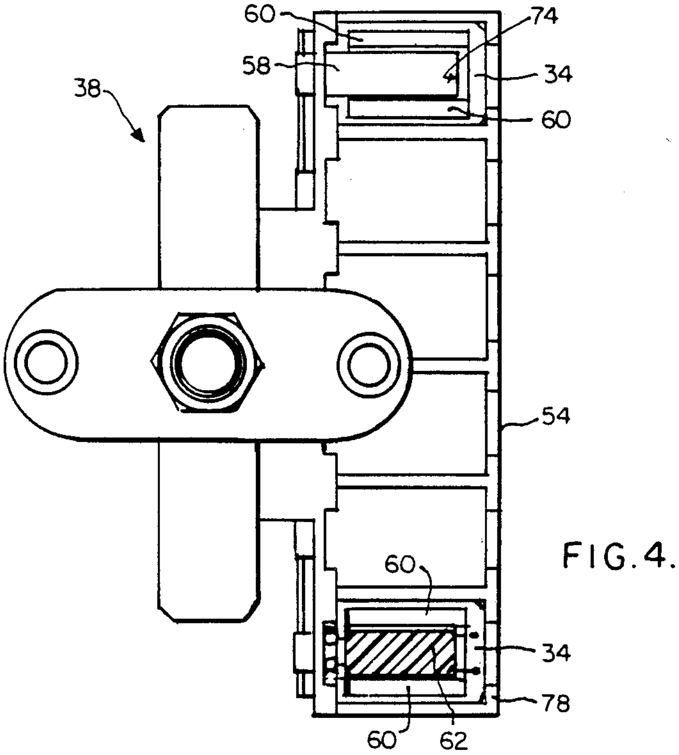

FIG. is a side view of gang-type brush holder according to the present invention;

FIG. 4 is a top view of the brush holder, visibly indicating a worn brush condition.

DESCRIPTION OF THE PREFERRED EMBODIMENTS

Figure 1:
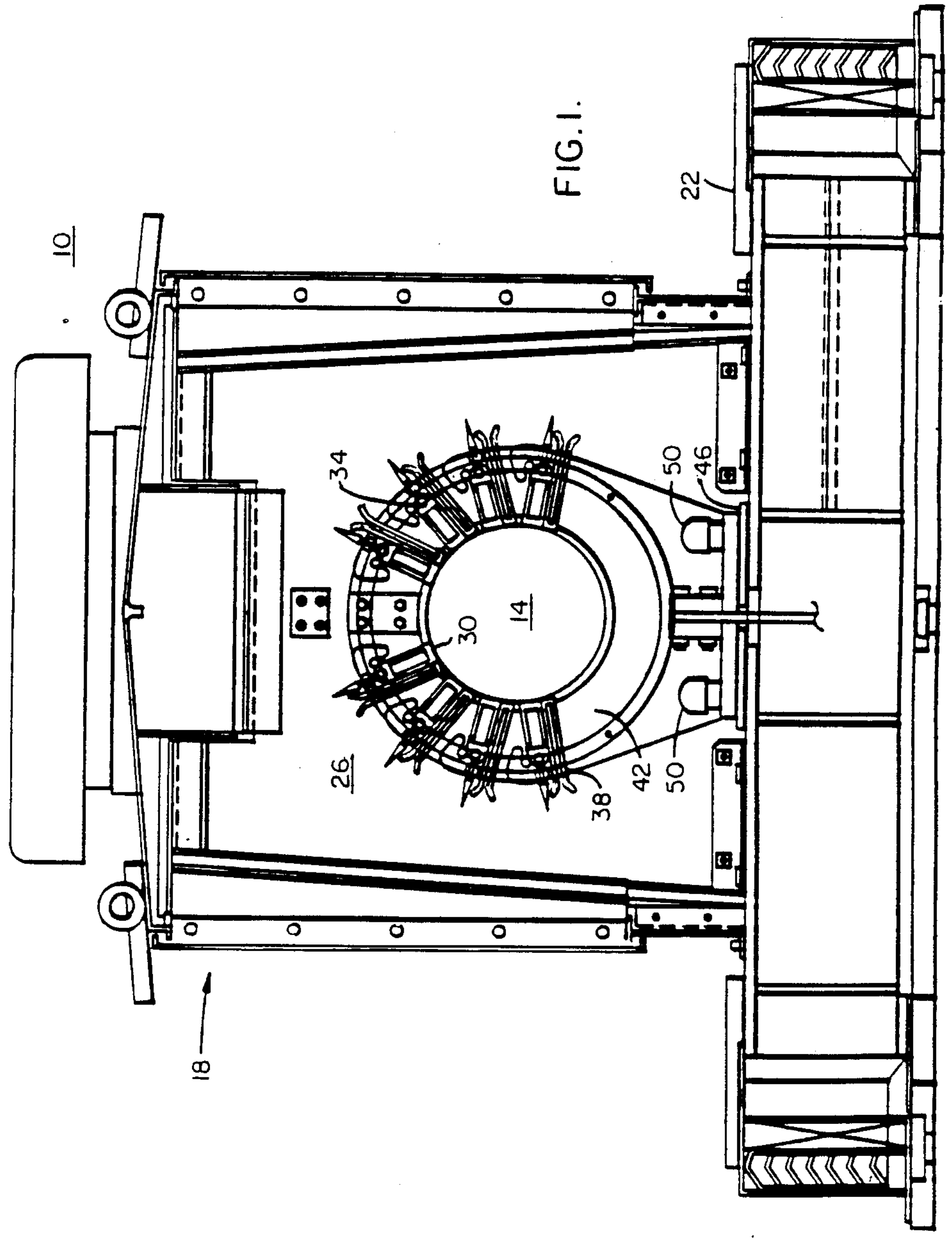
FIG. 1 is a cross sectional view of a typical turbine generator collector house.
Figure 2:
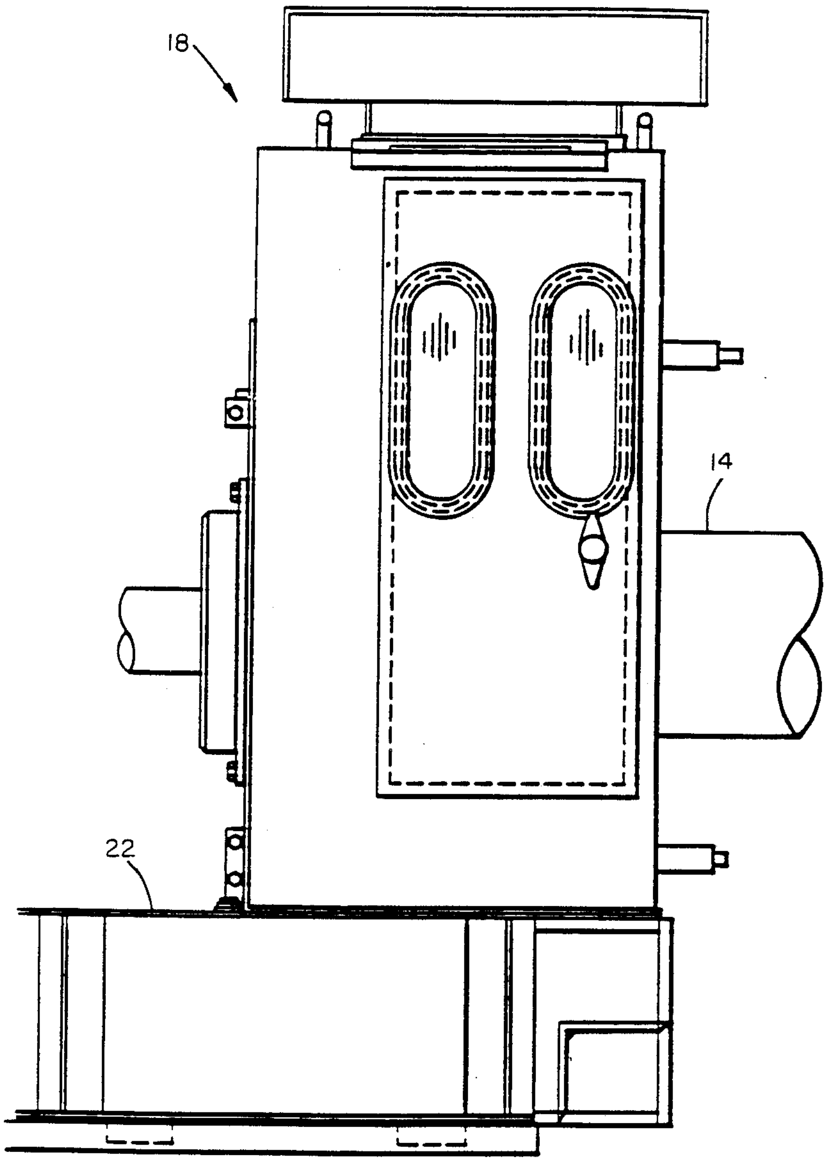
FIG. 2 is a side view of the collector house of FIG. 1.

Referring now to the drawings in detail, FIGS. 1 and 2 show a portion of a dynamoelectric machine 10, such as a turbine driven electric power generator, having a rotor shaft 14 which passes through an enclosure commonly referred to as a collector house 18. A fixed base 22 provides the floor of the collector house 18. The collector house 18 encloses a collector set 26 which includes one or more axially spaced collector rings 30 mounted on and rotatable with the shaft 14. The collector set 26 includes one or more sets of carbon brushes 34 mounted angularly about, and in sliding contact with, the collector rings 30 by brush holders 38, to be more fully described hereinafter. The brush holders 38 are supported by an annular plate 42, commonly referred to as a sickle, which is secured to the base member 22. The sickles 42 are electrically isolated from the base member 22 by an insulating pad 46 and have terminals 50 which extend through the base member 22 to engage electrical leads (not shown). In this manner, a DC electric current from an exciter (not shown) is transmitted to the generator rotor to provide the magnetic field for the electrical generator 10.

Such a collector house is described in U.S. Pat. No. 4,713,566, issued on Dec. 15, 1987 which is assigned to the present assignee, and is incorporated herein by reference.

Figure 3:
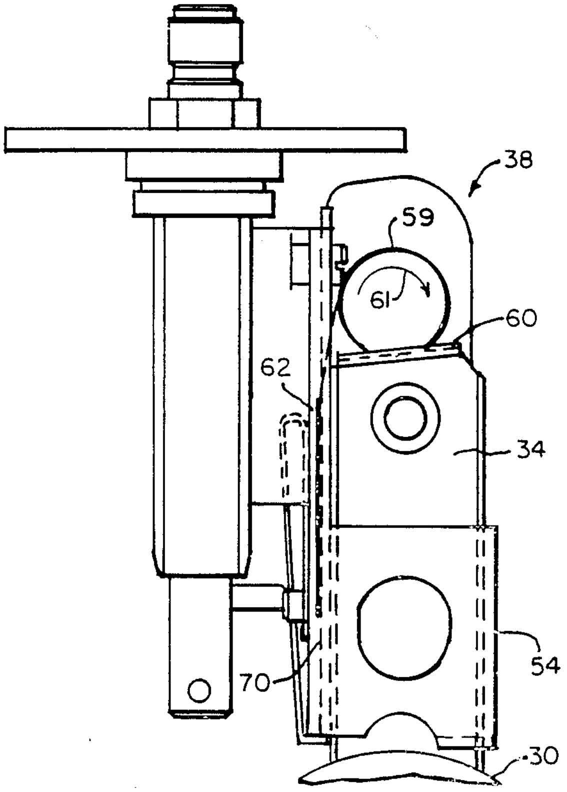

In some generators having a large number of brushes, several brushes 34 are ordinarily mounted or grouped in cartridges which can be removed and replaced through the collector house access doors while the unit is in operation. An example of such a brush holder 38 is shown in FIG. 3. In a typical gang-type brush holder 38, a plurality of carbon brushes 34, on the order of six (6), are arranged within a generally rectangular brush box 54. Each carbon brush 34 is biased in a radial direction against the collector ring 30 (i.e., downward in the figure) by a constant force spring 58. The spring 58 is a linear spring having a top portion 59 which is coiled to provide a downward force on the brush 34. The top portion 59 of each spring 58 is held in place on the brush 34 by a pair, of channels 60 on the top of each brush As the brush 34 wears, the top portion 59 of the spring 58 continues to coil, as indicated by arrow 61, to maintain the force thereon so as to keep the brush 34 in contact with the collector ring 30.

As a means for visibly indicating when a brush 34 has worn a predetermined amount, indicating that it should be replaced, each spring 58 has thereon a distinctive marking This marking is placed at a specified location, that location corresponding to the point at which a worn brush is to be removed and a new one installed. As mentioned above, as the brush 34 wears down the spring 58 continues to coil, thereby exposing more of the spring to view. Thus there is a ir relationship between the length of the brush 34 and the coiled portion 59 of the spring 58 which is exposed to view. In order for an operator to learn if any brushes 34 need to be replaced, he or she need only glance at the brushes to determine if any of the distinctive markings are visible.

In the preferred embodiment, a strip of self adhesive Teflon tape 62, red in color, is applied to a portion of the outer surface of the constant force spring 58. This can be done prior to the spring being assembled to the brush holder 38. As the brush 34 wears, the spring 58 automatically coils more and more and the length of the straight portion 70 decreases. As this occurs, the red tape 62, or other distinctive marking, in turn becomes more and more visible. This can be seen by comparing FIG. 3 (new brush) with FIG. 4 (worn brush). At some predetermined point such as when the entire surface of coiled portion 59 becomes red in color (FIG. 4), a visual indication is given that the brush 34 is worn and should be replaced.

The length and placement of the tape 62 on the spring 58 is calculated in advance to insure an accurate reading. These parameters depend on the particular characteristics of each carbon brush collection system, such as the original length of the brushes, how they are made, the original dimensions of the brushes and the holder, etc. When the tape 62, or marking, is placed at this predetermined location, the entire surface of the exposed coil portion 59 of the spring 58 will be highly visible, because of the red tape 62, to indicate that a particular brush 34 is to be replaced It is to be understood that various examples and types of distinctive markings can be placed on the spring 58. For example, a single, highly visible line 74 could be placed across the spring 58 at a predetermined location. This could be placed such that, when the brush 34 has worn to the point that it should be replaced, the spring 58 has coiled to a degree where the line 74 thereon is parallel with the front edge 78 of the brush holder 38. This is shown by the brush 34 and spring 58 shown on the right side of FIG. 4. Any type of distinctive marking which is clearly visible, and placed at a specified location to visually indicate a worn brush condition, can be positioned on the spring 58 to quickly and easily disclose to an inspector or operator such a condition. Moreover, a portion of the surface of the spring can be painted, also red in color, similar to the placing of the tape 62 thereon.

The invention provides a distinct advantage in that the interior brushes 34 in a gang-type brush holder 38 can easily be viewed. The springs 58 are readily viewable and will indicate at a glance whether a particular carbon brush is satisfactory or needs to be replaced. This provides a relatively low cost protection scheme for the collector set and associated generator equipment. Most importantly, a positive indication of a worn brush condition is quickly discoverable by the operator, so that prompt action can be taken.

While specific embodiments of the invention have been described in detail, it will be appreciated by those skilled in the art that various modifications and alterations would be developed in light of the overall teaching of the disclosure Accordingly, the particular arrangements disclosed are meant to be illustrative only and not limiting as to the scope of the invention which is to be given the full breadth of the appended claims and in any and all equivalents thereof.

What is claimed is:

1. In a dynamoelectric machine having a rotatable shaft, a collector ring axially spaced on the shaft and rotatable therewith, a plurality of stationary carbon collector brushes angularly supported about the collector ring and in sliding contact therewith, said brushes being grouped within a plurality of removable holders such that a portion of said brushes are singularly removable from contact with the collector ring, a plurality of springs each having one end secured to the brush holder and an opposite end coiled against said brush thereby biasing it against the collector ring such that said springs further coil as said brushes wear, and a distinctive marking associated with each of said springs for visibly indicating when one of said brushes within one of said removable holders has worn down a predetermined amount.

2. The apparatus as recited in claim 1, wherein the distinctive marking comprises a strip of colored tape disposed on each of said springs such that a worn brush condition is visibly indicated when the exposed portion of said spring is completely covered by said colored tape strip.

3. The apparatus as recited in claim 2, wherein the colored tape strip comprises a strip of self-adhesive, red Teflon tape.

4. The apparatus as recited in claim 1, wherein the distinctive marking comprises a highly visible line placed on each of said coil springs such that a worn brush indication is given when said line reaches a predetermined location with respect to the brush holder.

5. An electric generator having a rotatable shaft, a pair of collector rings axially spaced on the shaft and rotatable therewith, and a plurality of stationary carbon collector brushes angularly supported about said collector rings and in sliding contact therewith, said brushes being grouped within a plurality of removable holders such that a portion of said brushes are singularly removable from contact with said collector rings, a plurality of springs each having one end secured to the holder and an opposite end coiled against the brush thereby biasing said brush against the collector ring such that said springs further coil as said brushes wear, and a distinctive marking on each said spring and located at a specified position thereon, wherein said distinctive marking becomes visible when one of said brushes within one of said removable holders has worn down a predetermined amount.

6. The electric generator as recited in claim 5, wherein the distinctive marking comprises a strip of colored tape disposed on each of said springs such that a worn brush condition is visibly indicated when the exposed portion of said spring is completely covered by said colored tape strip.

7. The electric generator as recited in claim 6, wherein the colored tape strip comprises a strip of self-adhesive, red Teflon tape.

8. The electric generator as recited in claim 5, wherein the distinctive marking comprises a highly visible line placed on each of said coil springs such that a worn brush indication is given when said line reaches a predetermined location with respect to the brush holder.

* * * * *